March 22, 1966 C. A. HULCHER 3,241,469
CAMERA CONSTRUCTION
Filed March 10, 1964 3 Sheets-Sheet 1
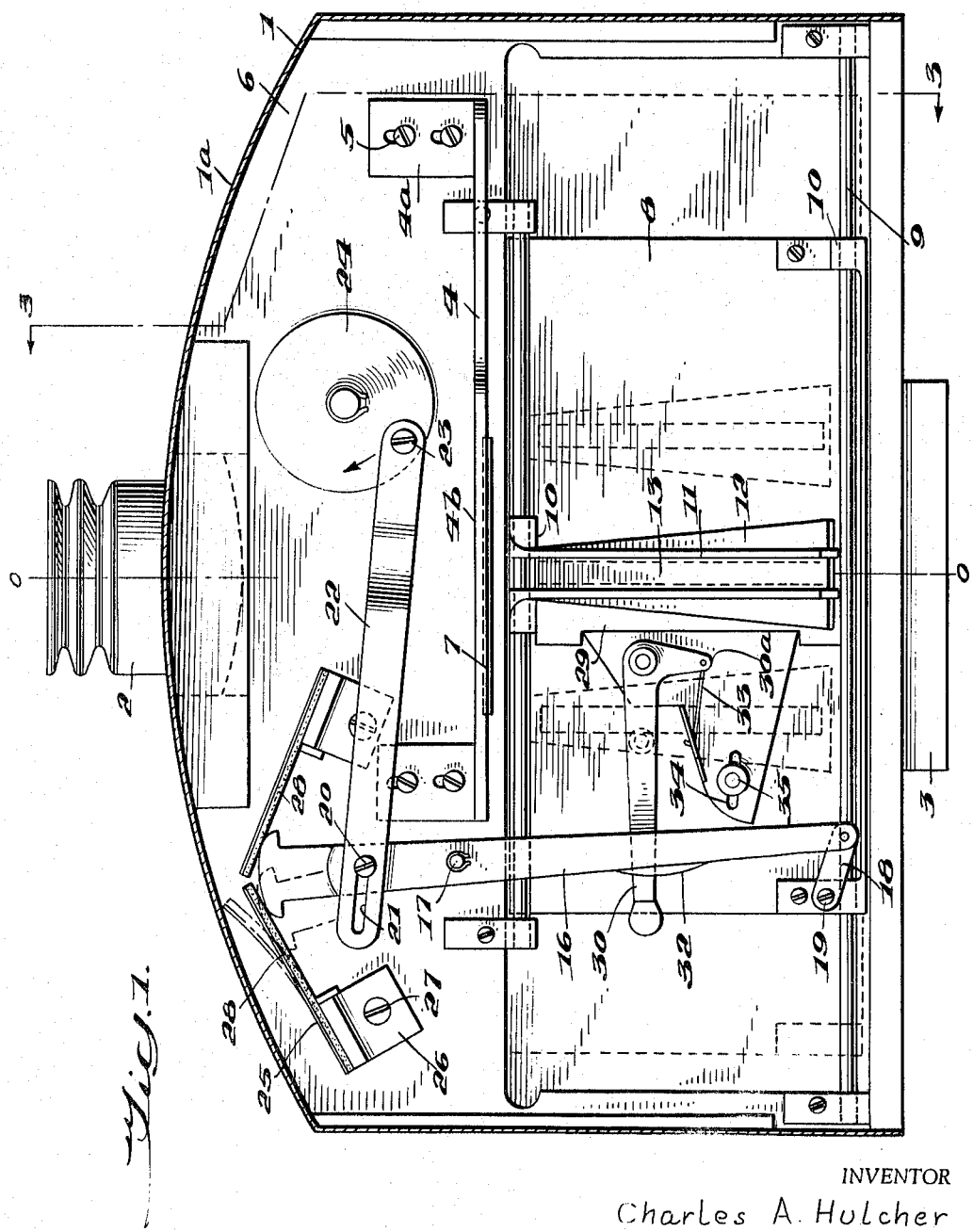
INVENTOR
Charles A. Hulcher
BY *Pierce, Schifflu & Parker*
ATTORNEYS

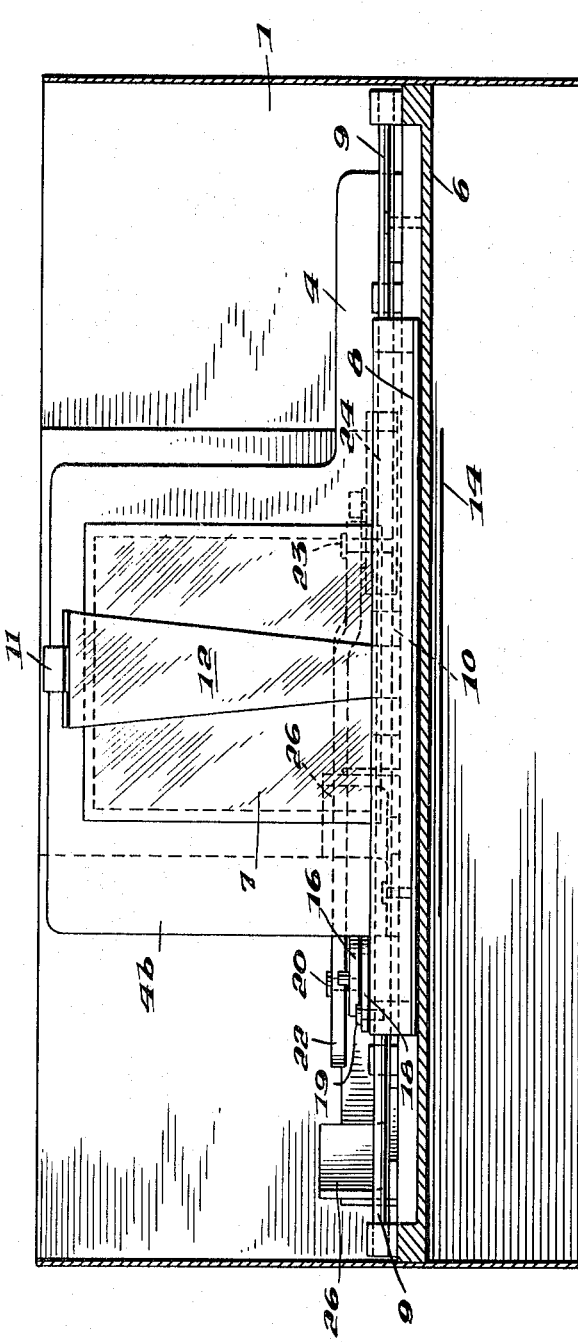

March 22, 1966  C. A. HULCHER  3,241,469
CAMERA CONSTRUCTION
Filed March 10, 1964  3 Sheets-Sheet 3
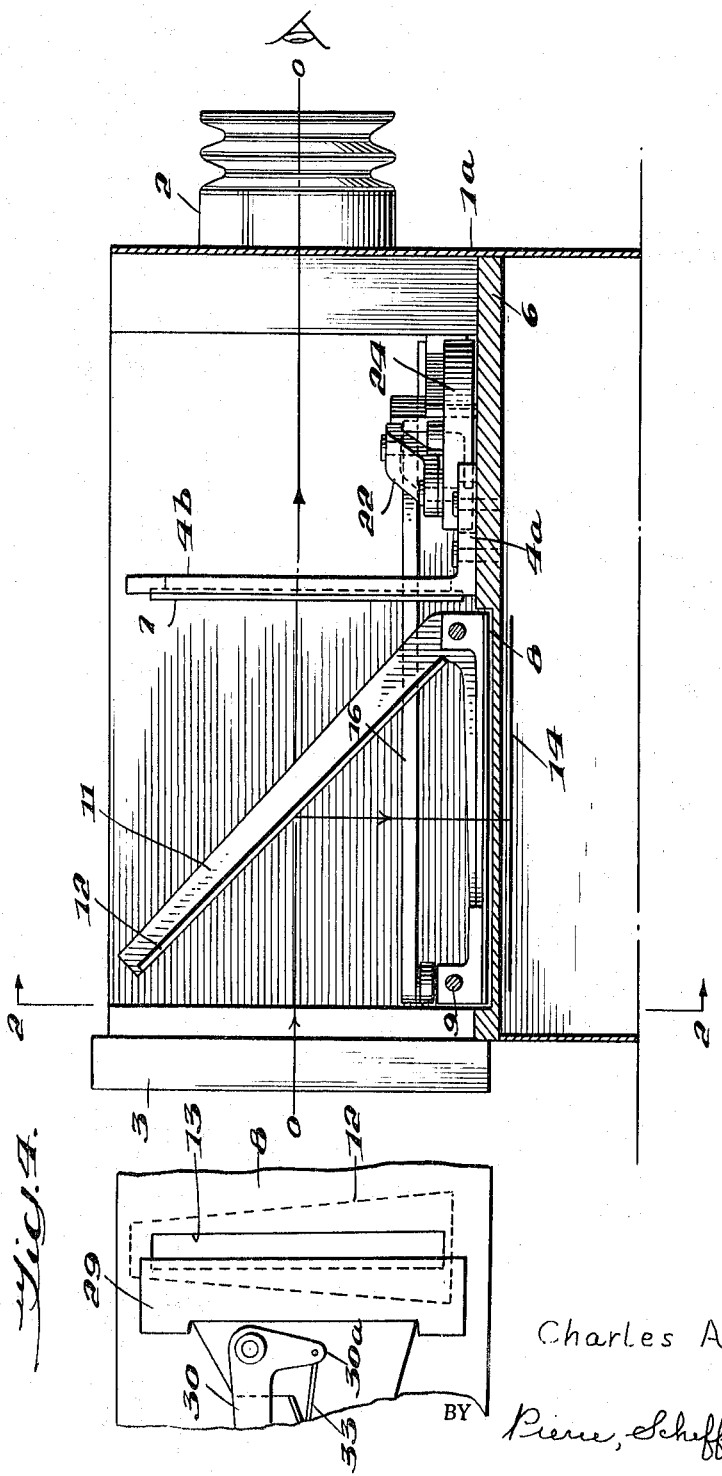
INVENTOR
Charles A. Hulcher
BY Pierce, Scheffler & Parker
ATTORNEYS

3,241,469
CAMERA CONSTRUCTION
Charles A. Hulcher, Hampton, Va., assignor to Charles A. Hulcher Company, Inc., a corporation of Virginia
Filed Mar. 10, 1964, Ser. No. 350,866
6 Claims. (Cl. 95—42)

The present invention relates to an improvement in camera construction, and is particularly directed to an improved construction for a camera of the general type wherein one and the same lens is used for viewing, focussing and photographing.

Cameras of the type referred to are known but have the disadvantage that the view through the lens must be interrupted just before the shutter is actuated to expose the film. For example, in United States Patent No. 1,746,741 granted February 11, 1930, to Rudolf Reiterer et al., use is made of a pivotally mounted mirror which can be interposed in the optical axis between the eye piece and lens. This mirror is tilted upwardly and away from the optical axis to permit direct viewing and focussing prior to actuating the shutter to take the picture but must then be tilted downwardly to a position intersecting the axis to reflect light incoming through the lens from the object onto the film plane in order to take the picture. During the time the reflecting mirror is tilted downward it completely blocks one's view through the eye piece and this can be a most serious drawback in training the camera, especially in cases where the object to be photographed is a movable one.

Continuous viewing during focussing and photographing has been possible but the only solution heretofore known is one as disclosed in French Patent No. 937,120 which makes use of a stationary, semi-transparent mirror placed across the optical axis at a 45° angle to pass light incoming through the lens along the optical axis to the viewing point represented by the eye piece and also reflect the same incoming light to the film plane which then serves to expose the film when the shutter is actuated. The disadvantage of this arrangement is obviously the serious loss in light due to the fact that a substantial part thereof is passed through the semi-transparent mirror to the eye piece and hence, never reaches the film.

The object of the present invention is to provide for an improved arrangement wherein one obtains an uninterrupted view through the lens during both focussing and picture taking. In particular, this desired result is effected by making use of a reflecting mirror in the form of a narrow strip which is held to one side of the light path during viewing and focussing and is then caused to move across the light path at the time the picture is taken. The narrow mirror strip is correlated to a slot in a focal plane shutter and moves with the shutter so that incoming light is reflected by the mirror strip through the shutter slot onto the film plane. By making the mirror relatively narrow in relation to the total field of view through the lens, its motion back and forth across the light path between the eye piece and lens will have no appreciable adverse effect on viewing even while the shutter is being operated. Moreover, since the focal plane shutter, and hence the mirror operate at a relatively high speed, whatever interference may exist is further minimized. Thus, one is enabled to maintain constant and adequate viewing both during focussing as well as when the picture is actually being taken.

The foregoing as well as other objects and advantages inherent in the invention will become more apparent from the following detailed description of a preferred embodiment thereof and from the accompanying drawings wherein:

FIG. 1 is essentially a top plan view of the camera with the cover removed and with the casing in section;

FIG. 2 is a transverse section taken on line 2—2 of FIG. 3;

FIG. 3 is a longitudinal section taken on line 3—3 of FIG. 1; and

FIG. 4 is a detail showing that portion of the shutter containing the light slot and the adjustable plate by which the effective width of the slot can be adjusted.

With reference now to the drawings, the camera is comprised of a casing 1 of any suitable configuration. The optical axis for the camera is indicated by line O—O. On this optical axis at the arcuate rear wall 1a of the casing is mounted an eye piece 2 which can be of the magnifying type. Mounted in the front wall 1b of the casing and also on the optical axis is a lens mount 3. A bracket 4 extends transversely within the casing intermediate the eye piece 2 and lens mount 3 and the end portions 4a thereof are secured in place by screws 5 to a transverse mounting plate or partition 6 arranged in the lower part of the casing above the film compartment. Bracket 4 includes a centrally located, upwardly extending inverted U-shaped portion 4b which serves as a frame supporting a ground glass plate 7 also located on the optical axis and upon which the object to be photographed can be focussed.

The shutter assembly for the camera is mounted in casing 1 in the space between the ground glass plate 7 and the lens mount 3. This shutter is of the focal plane type and comprises a rectangular, apertured plate 8 which is arranged to be shifted back and forth in a direction transverse to the optical axis O—O. Parallel spaced, transversely extending runner bars 9 support the shutter plate for its reciprocating movement, the shutter plate being provided at opposite sides thereof with a plurality of upstanding guides 10 through which the runner bars 9 extend to permit the necessary sliding movement of the shutter on the bars.

Mounted on and midway between the side edges of the shutter plate 8 is a bracket 11 which, as can be seen from FIG. 3 is disposed at an angle of 45° to the plane of the shutter and also therefore at the same angle to the optical axis. Secured to the under edge portion of bracket 11 is a mirror 12 in the form of an elongated silvered strip. In the illustrated embodiment, the mirror strip has a trapezoidal configuration with the wider end uppermost but this is not essential and other mirror configurations can be utilized so long as the width of the mirror is kept comparatively small so as to impose a minimum of interference across the field as it is swept back and forth across the optical axis.

As will be seen from FIG. 4, mirror 12 is located directly above the shutter aperture which, in this case, is constituted by an elongated, rather narrow slot 13 in the shutter plate 8 so that light incoming through the lens will be reflected vertically downward by mirror 12 through slot 13 and thence to the film plane 14. Details of the film and its transporting structure have not been included since these can take varied forms and are not germane to the present invention. The effective width of the shutter aperture 13 can be adjusted by means of a plate 29 which can be slid to a variable extent across one of the two longer sides of the aperture to mask off a portion of the aperture area. The details of this shutter aperture adjusting mechanism will be explained hereinafter.

For shifting the shutter assembly which includes the shutter plate 8 and mirror 12 back and forth, various mechanisms may be employed. In the illustrated embodiment, a lever system is utilized. This lever system includes a lever 16 pivotally mounted intermediate its ends about a pivot pin 17. The forward end of lever 16 is articulated to one end of a link 18 and the opposite end of link 18 is articulated to a pivot pin 19 which upstands on the shutter plate. Towards the rear end of lever 16 at the opposite side of the pivot axis for this lever, a pin 20 is provided which engages an elongated slot 21 located in the outer end portion of a drive arm 22. The inner end of drive arm 22 is articulated to a crank pin 23 located eccentrically on a rotatable drive wheel 24 which preferably possesses considerable mass to exert a flywheel effect as it is rotated in a clockwise direction as indicated by the arrow in FIG. 1.

As drive wheel 24 rotates, shutter plate 8 will thus be caused to be shifted back and forth across the film aperture in the partition wall 6 which separates the compartment shown in FIG. 1 containing the shutter mechanism and the other components so far described from the compartment containing the film and its transport mechanism. At the moment depicted in FIG. 1, drive arm 22 is being shifted to the left thus effecting counter-clockwise rotation of lever 16 which in turn serves to shift shutter 8 and mirror 12 to the right. At the moment depicted, shutter 8 and mirror 12 are in their midposition, i.e., in alignment with the optical axis, in moving across the film plane. When shutter 8 reaches its rightmost position, lever 16 will have reached the position depicted by broken lines and will have been brought to a halt in a shockless manner by a braking device. Two such braking devices are provided, one for each direction of movement of lever 16 and each such device is seen to be comprised of a resilient cantilever type brake arm 25 secured at one end to an L-shaped mounting bracket 26 fastened in place by screws 27 on partition plate 6. Each brake arm is lined with a pad 28 of friction type braking material engaging the rounded end 16a of lever 16.

The pin-and-slot connection 20–21 between lever 16 and drive arm 22 permits a desirable amount of coasting action while the shutter mechanism is being braked to a halt and a shifting action of the pin 20 to the opposite end of slot 21 in preparation for the start of the shutter mechanism in the opposite direction as the drive wheel 24 continues in its clockwise direction of rotation. By suitable known arrangements, not disclosed in the present application, the film will be transported to a new position after each shutter actuation in readiness for taking the next picture.

As previously explained, the present embodiment provides mechanism for adjusting the width of the shutter slot. This mechanism, as shown in FIGS. 1 and 4 is seen to be comprised of an adjustable plate 29 mounted so as to be shifted laterally of itself and thereby mask off more or less of the width of shutter slot 13. The mounting for the adjustable plate 29 includes an adjustment lever 30 pivotally mounted on a pin 31 upstanding on the shutter plate 8. The outer end portion of lever 30 engages an arcuate detent element 32 so as to retain the lever in the desired position. A toe portion 30a of lever 30 is coupled by a tie rod 33 to plate 29 and serves to shift plate 29 laterally as lever 30 is rotated. Plate 29 includes an elongated slot 34 engaging a pin 35 upstanding on shutter plate 8 for guiding movement of the plate 29 parallel to itself and parallel to one edge of the shutter slot 13.

In conclusion, it will be understood that the invention provides an improved construction for a camera of the type described and wherein one's view through the camera lens to the object along a rectilinear optical axis which contains the eye piece, the ground glass focussing surface and the lens is maintained without any practical interruption all during the viewing, focussing and actual picture taking, and without any appreciable loss of light within the camera between the lens and the film plane.

Also, while a preferred embodiment of the invention has been described and illustrated, various changes may be made in the construction and arrangement of the component parts without, however, departing from the scope of the invention as defined in the appended claims.

I claim:
1. In a camera construction for viewing, focussing and photographing through one and the same lens, the combination comprising a casing, means establishing an optical viewing axis through said casing, a lens and a focussing element suc has a ground glass plate located in spaced relation along said optical axis, a mirror strip located between said lens and focussing element and arranged at an angle to and intersecting said optical axis, means establishing a film plane laterally of said optical axis, a slotted focal plane shutter mounted for movement across said film plane, and means for actuating said mirror strip transversely of said optical axis across the incoming light from said lens simultaneously with actuation of said shutter to reflect the light onto said film plane through the slot in said shutter, the width of said mirror strip being comparatively small in relation to its total movement so as to interpose a minimum of interference while maintaining un-interrupted viewing along said optical axis throughout the period required for focussing and actuating said mirror strip.

2. In a camera construction for viewing, focussing and photographing through one and the same lens, the combination comprising a casing, means establishing an optical viewing axis through said casing, a lens and a focussing element such as a ground glass plate located in spaced relation along said optical axis, a focal plane shutter arranged parallel with and spaced laterally of said optical axis, and means for actuating said shutter in a direction transverse to said optical axis, said shutter including a slot, and a strip type mirror element mounted rigidly thereon in alignment with said slot and projecting from said shutter at an angle to the shutter plane, said mirror strip being so located between said focussing element and lens as to intersect said optical axis and thereby reflect incoming light from said lens through said shutter slot onto the film plane, and said mirror strip having a width which is small as compared with the stroke of said shutter thereby to interpose a minimum of interference while maintaining un-interrupted viewing along said optical axis throughout the period required for focussing and actuating said shutter.

3. A camera construction as defined in claim 2 and wherein said means for actuating said shutter is comprised of a pivotally mounted oscillatable lever having one end thereof secured to said shutter, a drive arm connected at one end to said lever by a pin-and-slot lost motion device and a rotatable drive wheel including a crank pin thereon to which the other end of said drive arm is articulated.

4. A camera construction as defined in claim 3 and which further includes a braking device cooperative with said pivotally mounted lever for braking said lever and hence said shutter to standstill prior to reaching the end of its stroke.

5. A camera construction as defined in claim 4 wherein said braking device is constituted by a cantilever type spring arm lined with a braking material which is frictionally engaged with the end of said pivotally mounted lever opposite the end connected to said shutter.

6. A camera construction as defined in claim 3 wherein said rotatable drive wheel is comparatively heavy to exert a flywheel effect.

References Cited by the Examiner

UNITED STATES PATENTS 3,008,397   11/1961   Winkler _____ 95—42

JOHN M. HORAN, *Primary Examiner.*